US011150632B2

(12) United States Patent
Weng et al.

(10) Patent No.: US 11,150,632 B2
(45) Date of Patent: Oct. 19, 2021

(54) SYSTEM AND METHOD FOR FIELD DEVICE MANAGEMENT USING CLASS PARAMETER SET

(71) Applicant: Yokogawa Electric Corporation, Tokyo (JP)

(72) Inventors: Wei Hong Weng, Singapore (SG); Ma Norina Epa Jandusay, Singapore (SG); Charisma Delos Reyes Cu-Unjieng, Singapore (SG)

(73) Assignee: Yokogawa Electric Corporation, Musashino (JP)

( * ) Notice: Subject to any disclaimer, the term of this patent is extended or adjusted under 35 U.S.C. 154(b) by 650 days.

(21) Appl. No.: 15/923,205

(22) Filed: Mar. 16, 2018

(65) Prior Publication Data
US 2019/0286098 A1   Sep. 19, 2019

(51) Int. Cl.
| | | |
|---|---|---|
| *G06F 16/00* | (2019.01) | |
| *G05B 19/409* | (2006.01) | |
| *G05B 19/042* | (2006.01) | |
| *G06F 16/23* | (2019.01) | |
| *G06F 16/26* | (2019.01) | |
| *G06F 16/27* | (2019.01) | |

(52) U.S. Cl.
CPC ......... *G05B 19/409* (2013.01); *G05B 19/042* (2013.01); *G06F 16/23* (2019.01); *G06F 16/26* (2019.01); G05B 2219/25428 (2013.01); G05B 2219/31104 (2013.01); G05B 2219/31121 (2013.01); G05B 2219/31344 (2013.01); *G06F 16/27* (2019.01)

(58) Field of Classification Search
CPC .......... G06F 16/10; G06F 16/23; G06F 16/25; G06F 16/26; G06F 16/27; G06F 16/258
USPC ........................................................ 707/736
See application file for complete search history.

(56) References Cited

U.S. PATENT DOCUMENTS

| | | | | |
|---|---|---|---|---|
| 5,812,394 | A  * | 9/1998 | Lewis ................ | G05B 19/0426 700/17 |
| 6,850,252 | B1 * | 2/2005 | Hoffberg ............ | G06K 9/00369 348/E7.061 |
| 7,557,702 | B2 * | 7/2009 | Eryurek ............... | G05B 23/027 340/511 |
| 8,578,059 | B2 * | 11/2013 | Odayappan ........ | G05B 19/0426 710/8 |
| 9,043,919 | B2 * | 5/2015 | Wyatt .................. | G06F 21/564 726/25 |
| 10,018,998 | B2 * | 7/2018 | Ratilla .................... | G01L 27/00 |
| 10,126,921 | B2 * | 11/2018 | Furihata ............ | G05B 19/0425 |
| 10,242,193 | B1 * | 3/2019 | Babun ..................... | G06F 21/57 |

(Continued)

*Primary Examiner* — Ashish Thomas
*Assistant Examiner* — Rezwanul Mahmood
(74) *Attorney, Agent, or Firm* — Sughrue Mion, PLLC

(57) ABSTRACT

A plant device management system, which is configured to efficiently manage parameter information for field devices, in order for plant engineering, operation and maintenance is disclosed. The plant device management system includes, but is not limited to, a device parameter set manager, which is configured for creating class parameter set, configuring class parameter set, assigning class parameter set, auditing parameters and so forth. The device parameter set manager of the plant device management system may include, but is not limited to, a device parameter set creator tool, a device parameter set configuring tool, a device template manager and a device parameter auditor.

14 Claims, 11 Drawing Sheets

(56) References Cited

U.S. PATENT DOCUMENTS

| | | | |
|---|---|---|---|
| 10,534,354 B2* | 1/2020 | Kodama | G05B 19/41855 |
| 2002/0123864 A1* | 9/2002 | Eryurek | G05B 23/0254 |
| | | | 702/188 |
| 2004/0133598 A1* | 7/2004 | Dobrowski | G06F 16/258 |
| 2005/0222698 A1* | 10/2005 | Eryurek | G06F 8/34 |
| | | | 700/90 |
| 2006/0092861 A1* | 5/2006 | Corday | H04L 41/0246 |
| | | | 370/256 |
| 2006/0200253 A1* | 9/2006 | Hoffberg | G05B 15/02 |
| | | | 700/19 |
| 2006/0206866 A1* | 9/2006 | Eldrige | G06F 8/71 |
| | | | 717/122 |
| 2006/0242626 A1* | 10/2006 | Pham | G06F 8/61 |
| | | | 717/121 |
| 2007/0075916 A1* | 4/2007 | Bump | G05B 19/41845 |
| | | | 345/3.1 |
| 2007/0077665 A1* | 4/2007 | Bump | G06F 3/0484 |
| | | | 438/14 |
| 2007/0078540 A1* | 4/2007 | Bump | G06Q 10/06 |
| | | | 700/90 |
| 2007/0079250 A1* | 4/2007 | Bump | G05B 23/0216 |
| | | | 715/762 |
| 2007/0139441 A1* | 6/2007 | Lucas | G06F 8/38 |
| | | | 345/619 |
| 2007/0185865 A1* | 8/2007 | Budzik | G06F 16/248 |
| 2007/0250180 A1* | 10/2007 | Bump | G05B 19/41845 |
| | | | 700/1 |
| 2007/0283417 A1* | 12/2007 | Smolen | G06F 16/2308 |
| | | | 726/2 |
| 2008/0065705 A1* | 3/2008 | Miller | G05B 23/0221 |
| 2008/0065706 A1* | 3/2008 | Miller | G05B 15/02 |
| 2008/0120129 A1* | 5/2008 | Seubert | G06Q 10/10 |
| | | | 705/35 |
| 2008/0125877 A1* | 5/2008 | Miller | G05B 15/02 |
| | | | 700/29 |
| 2009/0112335 A1* | 4/2009 | Mehta | G05B 17/02 |
| | | | 700/29 |
| 2009/0216786 A1* | 8/2009 | Akiyama | G06F 8/34 |
| 2009/0287321 A1* | 11/2009 | Lucas | G05B 19/4188 |
| | | | 700/79 |
| 2010/0023140 A1* | 1/2010 | Kodama | G05B 19/4185 |
| | | | 700/83 |
| 2011/0040390 A1* | 2/2011 | Blevins | G05B 19/0426 |
| | | | 700/18 |
| 2012/0185065 A1* | 7/2012 | Fujii | G05B 15/02 |
| | | | 700/83 |
| 2012/0226786 A1* | 9/2012 | Nekkar | G05B 19/0426 |
| | | | 709/220 |
| 2012/0253477 A1* | 10/2012 | Hodson | G05B 19/0426 |
| | | | 700/12 |
| 2013/0103677 A1* | 4/2013 | Chakra | G06F 16/248 |
| | | | 707/723 |
| 2013/0190902 A1* | 7/2013 | Itou | G05B 15/02 |
| | | | 700/83 |
| 2013/0257627 A1* | 10/2013 | Rafael | G05B 19/0426 |
| | | | 340/691.6 |
| 2014/0046618 A1* | 2/2014 | Arunachalam | G05B 19/0428 |
| | | | 702/127 |
| 2014/0280952 A1* | 9/2014 | Shear | H04L 63/10 |
| | | | 709/226 |
| 2014/0282586 A1* | 9/2014 | Shear | G06F 16/285 |
| | | | 718/104 |
| 2015/0055637 A1* | 2/2015 | Miyazawa | H04W 28/16 |
| | | | 370/337 |
| 2015/0066162 A1* | 3/2015 | Hokeness | G05B 19/0426 |
| | | | 700/28 |
| 2015/0127480 A1* | 5/2015 | Herrman | G06Q 30/0283 |
| | | | 705/26.4 |
| 2015/0160816 A1* | 6/2015 | Furihata | G06F 3/0484 |
| | | | 715/736 |
| 2015/0233790 A1* | 8/2015 | Ratilla | G05B 19/0426 |
| | | | 702/188 |
| 2015/0233791 A1* | 8/2015 | Ratilla | G01M 99/00 |
| | | | 702/188 |
| 2015/0234381 A1* | 8/2015 | Ratilla | G01F 25/00 |
| | | | 702/104 |
| 2015/0271229 A1* | 9/2015 | Bullotta | H04L 65/60 |
| | | | 709/219 |
| 2015/0370776 A1* | 12/2015 | New | G06F 3/0482 |
| | | | 715/234 |
| 2016/0132037 A1* | 5/2016 | Weng | G05B 19/0426 |
| | | | 700/87 |
| 2016/0170825 A1* | 6/2016 | Nguyen | G06F 11/0751 |
| | | | 714/15 |
| 2016/0255139 A1* | 9/2016 | Rathod | H04L 51/046 |
| | | | 709/203 |
| 2016/0292051 A1* | 10/2016 | Fujimoto | H04W 4/38 |
| 2016/0321099 A1* | 11/2016 | Cismas | H04L 41/0893 |
| 2016/0334773 A1* | 11/2016 | Washiro | G05B 19/0426 |
| 2017/0011105 A1* | 1/2017 | Shet | G06Q 10/00 |
| 2017/0011329 A1* | 1/2017 | Tokuoka | G06F 3/14 |
| 2017/0180567 A1* | 6/2017 | Sharma | H04M 3/42178 |
| 2017/0212782 A1* | 7/2017 | Kurian | H04L 41/0843 |
| 2017/0261969 A1* | 9/2017 | Peake | G05B 19/41835 |
| 2017/0329580 A1* | 11/2017 | Jann | G06F 8/35 |
| 2017/0345224 A1* | 11/2017 | Itou | G05B 23/0267 |
| 2017/0371325 A1* | 12/2017 | Kodama | G06Q 10/20 |
| 2018/0024847 A1* | 1/2018 | Campbell | H04L 67/12 |
| | | | 715/708 |
| 2018/0107201 A1* | 4/2018 | Cu-Unjieng | G05B 23/0208 |
| 2018/0210428 A1* | 7/2018 | Jundt | H04L 67/12 |
| 2019/0101898 A1* | 4/2019 | Middendorf | G06Q 10/06313 |
| 2019/0286098 A1* | 9/2019 | Weng | G05B 19/042 |
| 2021/0019360 A1* | 1/2021 | Li | G06F 40/169 |
| 2021/0103262 A1* | 4/2021 | Naidoo | G06F 11/3664 |

* cited by examiner

SYSTEM AND METHOD FOR FIELD DEVICE MANAGEMENT USING CLASS PARAMETER SET

TECHNICAL FIELD

The present disclosure relates to field device configuration and management for process controls and industrial processes, specifically relating to configuring and managing field devices through efficiently managing class parameter sets and parameters.

BACKGROUND

In an industrial plant environment, plant asset management (PAM) systems are used to manage the large amount of data relating to field devices and control instruments for an industrial plant. Some of the operations or functions of a plant asset management system may include, but are not limited to, maintaining a plant asset database, monitoring device alarms, events and user activities, as well as conducting device diagnosis.

To manage the plurality of field devices, the devices are to be registered and configured into various device applications for working within an industrial process, and the configuration is performed by configuring parameter information using a configuration system. For instance, as disclosed in related art, the parameter setting for field device configuration could be tedious and time-consuming, since there is a need to configure all the parameters and parameter values in a respective device template, even though sometimes many of the parameters are not necessarily to be configured.

Furthermore, in related art, parameter information of field devices for configuration is obtained with a prerequisite of field device being physically connected with the process control systems of a plant, which leads device engineering activity being performed only at a late stage of plant engineering, and thus lengthens the device commissioning time and project execution time.

Still further, there are usually thousands of field devices in a typical industrial plant, which belong to a plurality of device classes, respectively. And this has imposed significant challenges for efficiently managing the complex relationships among field devices, device classes and parameters, and as a result, many efforts are demanded for field device configuration and management.

Given all these, it is desirable to have a system and method, which could lead to a reduction of engineering cost and manage field device types and versions in an effective manner, as well as be less time-consuming and requires minimal man power.

SUMMARY

One or more embodiments of the disclosure relate to a plant device management system, which is configured to efficiently manage parameters for field devices. The plant device management system are applicable to or utilizable by any available plant asset management (PAM) system for the management of parameters of the field devices. The plant device management system may include, but is not limited to, a device description file storage and a device parameter set manager. The device description file storage is configured to store a plurality of device description (DD) files which each include parameters and parameter values of the field devices. And, the device parameter set manager may include, but is not limited to, a device parameter set creator tool, a device parameter set configuring tool, a device template manager and a device parameter auditor.

In some embodiments, the device parameter set manager of the plant device management system may include the device parameter set creator tool, which is configured to create one or more class parameter sets (PS) for one device class using device description files stored in the device description file storage. Moreover, in some cases, the device parameter set creator tool, is configured to create one or more class parameter sets by utilizing other sources, for instance, DTM (Device Type Manager) data sets, other than the device description files.

In some embodiments, the device parameter set manager of the plant device management system may include the device parameter set configuring tool, which is configured to enable changing or modifying one or more class parameter sets (PS) created by the device parameter set creator tool.

In some embodiments, the device parameter set manager of the plant device management system may include the device template manager, which is configured to assign a plurality of device templates to a plurality of registered and non-physical field devices. The device template manager is configured to allow the plurality of field devices to be configured into a plurality of device applications, according to the plurality of class parameter sets included in the plurality of device templates.

In some other cases, the device parameter set manager of the plant device management system may further include the device parameter auditor, which is configured to compare between parameters of a class parameter set (PS) assigned to the registered and non-physical field devices, and corresponding parameters of the class parameter set (PS) from physical field devices installed in the plant.

One or more embodiments of the disclosure relate to a plant device management method, which is able to efficiently and advantageously manage parameters for field devices. The method may include the steps, but are not limited to, assigning a respective class parameter set, to at least one of registered and non-physical plant field devices by the device template manager; acquiring each class parameter set assigned by the device template manager by the device parameter auditor; acquiring a corresponding physical device class parameter set from a respective physical plant field devices by the device parameter auditor; and comparing the acquired parameter information relating to the above by the device parameter auditor.

Still further, in some embodiments, the plant device management method may include the steps of changing parameter values and/or flagging a device parameter included in the respective class parameter set assigned by the device template manager by the device parameter set configuring tool.

In addition, the plant device management method may include the step of comparing the flagged device parameter of each class parameter set assigned, and a corresponding parameter of the corresponding physical device class parameter set.

DETAILED DESCRIPTION

Figure 1A:
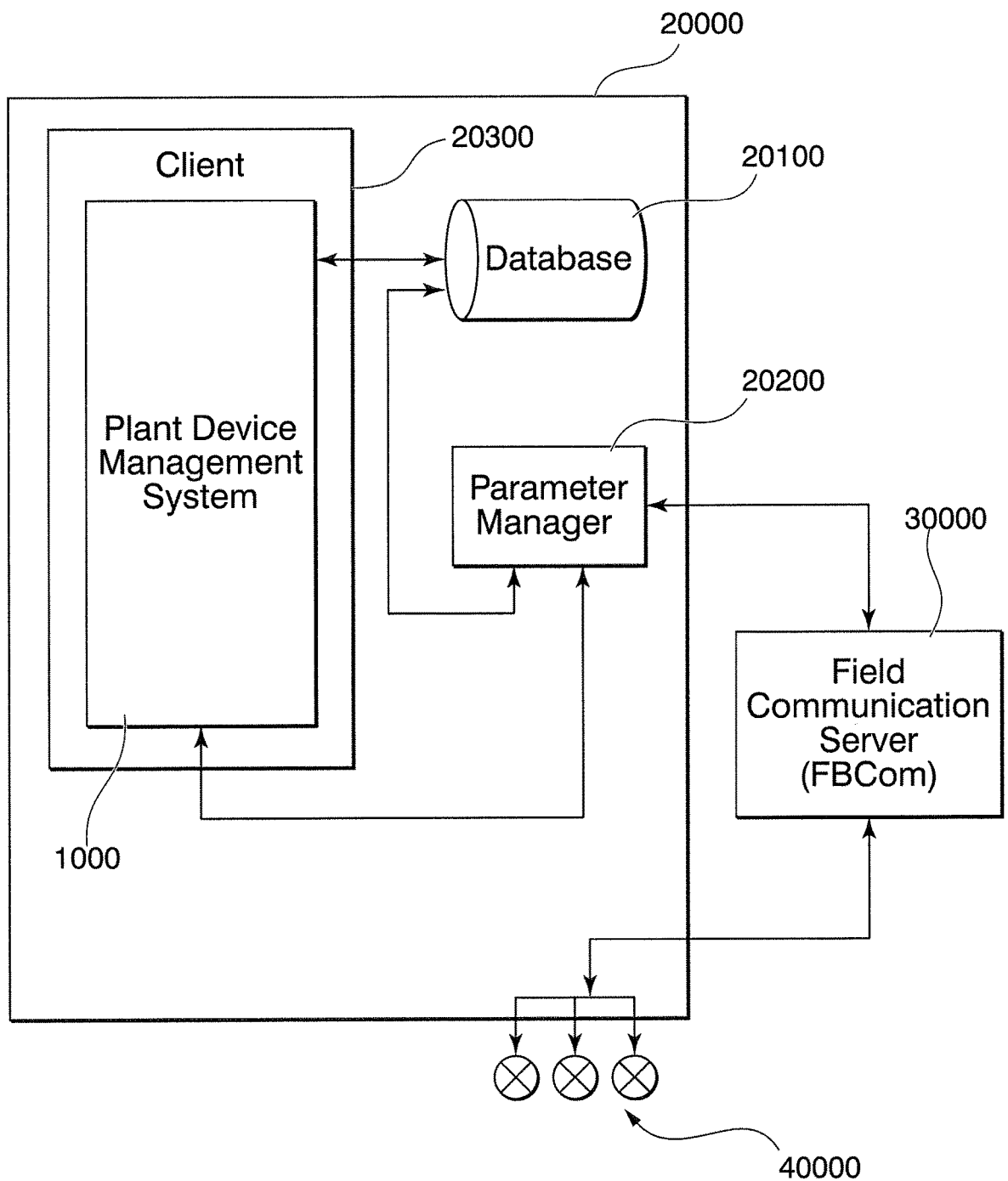
FIG. 1A illustrates a schematic view of a plant device management system of a plant asset management system, for an industrial plant.

In general, industrial plants such as chemical plants, oil refineries, and power plants may each include thousands of field devices. The field devices in the plant are different in configuration, function and operation among each other. The field devices may be configured differently to perform as valve actuators, valve positioners, switches and transmitters for measuring temperature, pressure and flow rate.

The industrial plant also includes a management system for monitoring and managing the field devices in the plant. The industrial plant may, for example, include a plant asset management system (PAM) configured to manage parameters for the field devices in the plant for diagnostics of the field devices and for monitoring status of the field devices, thereby allowing engineers, operators and maintenance staff to know the status of the plant, and ensure the reliability and accuracy of the control systems in the plant.

The disclosure of the present embodiments includes descriptions of a plant device management system and method of efficiently managing parameters of the field devices. The plant device management system and method are applicable to or utilizable by any available plant asset management (PAM) system for management of the parameters of the field devices. The plant device management system may include, but is not limited to, a device description file storage and a device parameter set manager. The device description file storage is configured to store a plurality of device description (DD) files which each include parameters and parameter values of the field devices. The device parameter set manager may include, but is not limited to, a device parameter set creator tool, a device parameter set configuring tool, a device template manager and a device parameter auditor.

The device parameter set creator tool is configured to communicate with or access to the device description file storage to acquire the device description files from the device description file storage. The device parameter set creator tool is configured to create one or more class parameter sets (PS) for one device class using the device description files, wherein the one or more class parameter sets each include a plurality of parameters and parameter values.

The device parameter set configuring tool of the plant device management system is configured to enable changing or modifying one or more class parameter sets (PS) created by the device parameter set creator tool. In some cases, the device parameter set configuring tool may be configured to indicate or flag parameters of the one or more class parameter sets (PS) or to change parameter values of the class parameter sets (PS) for changing or modifying the one or more class parameter sets (PS).

The device template manager of the plant device management system is configured to assign a plurality of device templates to a plurality of registered and non-physical field devices. In some cases, the device template manager is configured to assign a respective device template of the plurality of device templates to at least one of registered and non-physical plant field devices which are classified to each of the plurality of device classes, wherein the respective device template includes a respective class parameter set (PS) of the class parameter sets. The respective class parameter set is associated with a respective device class of the plurality of device classes. The device template manager is configured to allow the plurality of field devices to be configured into different device applications, based on the plurality of device templates including the plurality of class parameter sets. Typical examples of the different device applications may include, but are not limited to, level transmitter and flow transmitter. The term "registered and non-physical" field device used herein refers to a field device that is placed in a state that the field device is defined by a plant asset management (PAM) system based on vendor, model and revision of the field device, but is not physically connected to the process control system.

In some other cases, the device parameter auditor is configured to compare parameters of a class parameter set (PS) assigned to the registered and non-physical field devices by the device template manager, and corresponding parameters of the class parameter set (PS) from physical field devices installed in the plant, for subsequent operations such as replacing parameters of the field devices in the plant. The term "physical" plant field device used herein refers to a field device that is physically connected to the process control system.

The above-described system and method allows users to efficiently manage the complex relationships among field devices, device classes, class parameter sets (PS), and parameters relating to class parameter sets (PS), therefore to effortlessly configure field devices and manage the field devices.

Referring now to FIG. 1A, it illustrates a schematic view of a plant device management system 1000 included in a plant asset management (PAM) system 20000 for industrial processes, the plant asset management (PAM) system 20000 may include, database 20100, and parameter manager 20200 and client 20300. In a typical industrial plant, it may include thousands of field devices 40000, which are connected to the plant asset management (PAM) system 20000 via field communication server (FBCOM) 30000. The plant device management system 1000 disclosed of the plant asset management (PAM) system 20000 has provided an efficient and less time-consuming means of managing the parameter information for field devices for process controls and industrial processes.

Figure 1B:
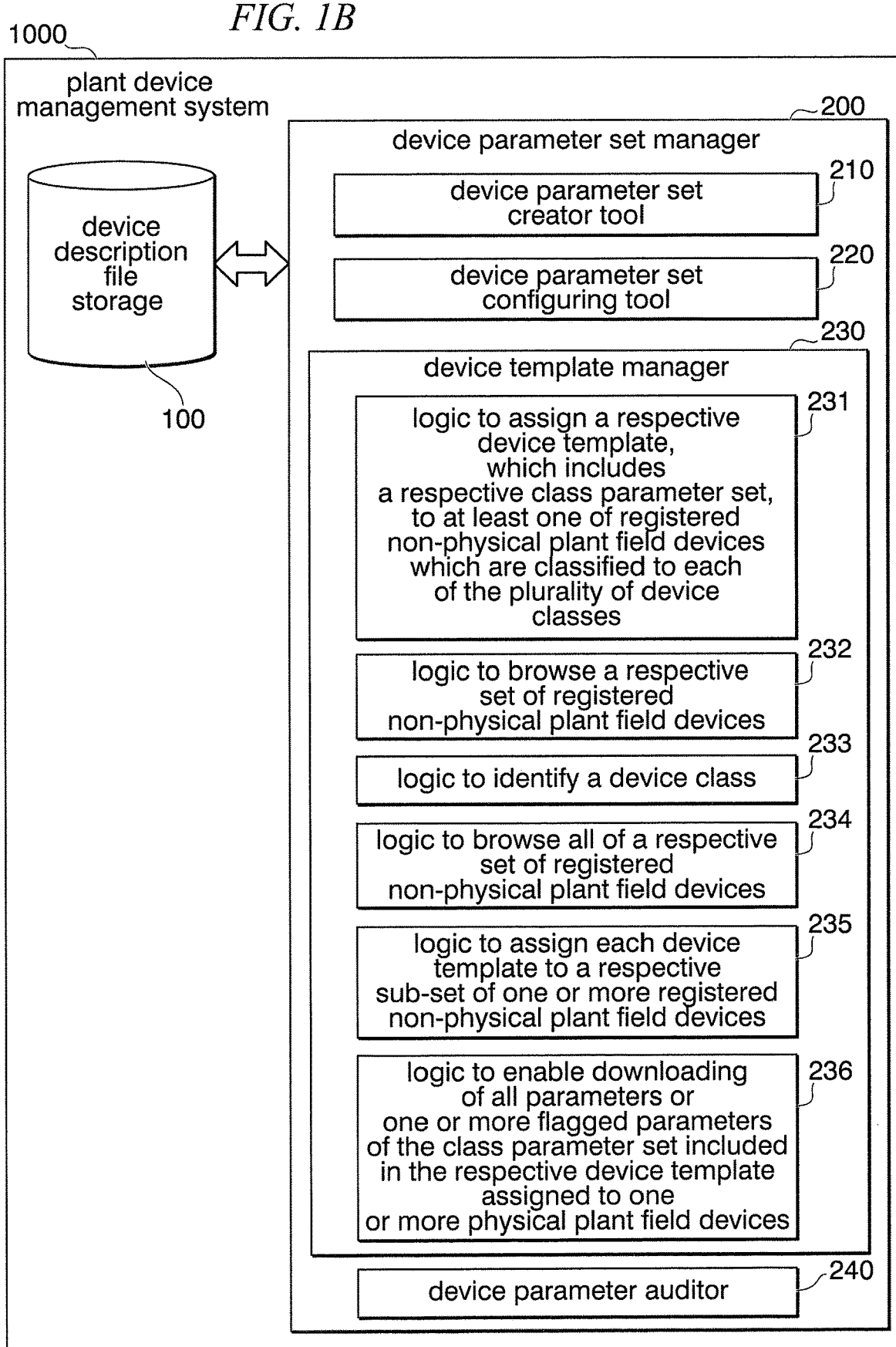
FIG. 1B illustrates a block diagram of an exemplary plant device management system, according to one or more embodiments.

FIG. 1B illustrates an example of a plant device management system 1000 according to some embodiments. As shown in FIG. 1B, the plant device management system 1000 includes a device description file storage 100 and a device parameter set manager 200. The device description file storage 100 is configured to store a plurality of device description (DD) files, wherein, each device description (DD) file provides information including, but is not limited to, blocks, various parameters in the blocks, and pre-determined or initial values for the various parameters, and their supported range. Device description (DD) files are normally provided by device manufacturers/vendors, and parameter and parameter value information included in the device description files could be engineered by a host system, in order to utilize device capabilities and functions. One example of a host system could be a plant asset management (PAM) system, which is able to communicate with and manage field devices.

As shown in FIG. 1B, the device parameter set manager 200 of the plant device management system 1000 may include a device parameter set creator tool 210, which is configured to create one or more class parameter sets (PS) for one device class using the device description (DD) files in the device description file storage 100. And each device description (DD) file is being associated with a respective device class, which is pre-defined in accordance with certain classification rules. In some cases, the device parameter set creator tool 210 is configured to communicate with or access to the device description file storage 100 to acquire and interpret the device description files from the device description file storage 100. The device parameter set creator tool 210 is configured to create one or more class parameter sets (PS) for one device class using the device description files, wherein the one or more class parameter sets each include a plurality of parameters and parameter values.

In the current one or more embodiments, a device description file parser (not shown in the figure) may be used to interpret the device description (DD) files on the basis of IEC 61804-3 standards, which is supported by HART and Foundation Fieldbus (FF-H1) protocol based field devices, for extracting parameters and default values of the parameters, and thus creating one or more class parameter sets (PS). The device description file parser described herein, could be understood as a software component or logic, which is configured to interpret the structure and contents of a device description file, and providing a structural representation of the information in the device description file.

Moreover, in some cases, the device parameter set creator tool 210, is not limited to create one or more class parameter sets (PS) only from using device description files, other sources other than device description files, for instance, DTM (Device Type Manager) data sets could also be interpreted and used by the device parameter set creator tool 210 to create one or more class parameter sets (PS), when DTM is used to interface between the plant asset management system and field devices.

In some cases, the disclosed device parameter set creator tool 210 is configured to create one or more class parameter sets (PS) for one device class, through extracting parameters and default values of the parameters from the device description (DD) files of "offline" field devices, which could also be referred to as "registered and non-physical" field devices. The term "registered and non-physical" field device described herein refers to a field device that is placed in a state that the field device is defined by a plant asset management (PAM) system based upon the information relating to, but is not limited to, vendor, model and revision, but has not been physically connected to the process control system in a plant. Registration of a field device with a plant asset management (PAM) system could be performed by plug & play through Field Communication Server (FBCOM) or manually completed. Field Communication Server (FBCOM) is the gateway between plant asset management (PAM) system and field devices. Herein, the above-described configurations will provide advantages in technical view of device configuration of field devices for the industrial plant engineering. For example, the above-described configurations will allow class parameter sets (PS) to be created for "offline" devices which are not physically connected to the process control systems in a plant, for example, prior to those "offline" devices to be physically connected with the process control systems in a plant. Therefore, device commissioning time could be substantially reduced after the devices are physically connected with the process control systems in a plant. Commissioning is a process for testing if the field devices will perform one or more specified functions according to design objectives or specifications.

In some cases, the device parameter set manager 200 of the plant device management system 1000 may also include a device parameter set configuring tool 220, which is configured to enable changing or modifying one or more class parameter sets (PS) created by the device parameter set creator tool 210. The device parameter set configuring tool 220 could be configured to indicate or flag parameters of the one or more class parameter sets (PS) or to change parameter values of the class parameter sets (PS) for changing or modifying the one or more class parameter sets (PS). The changed or modified one or more class parameter sets (PS) could also be saved as a new class parameter set (PS) for one device class. As a result, the device parameter set configuring tool 220 will perform the above described operations, which makes it possible to have a plurality of class parameter sets (PS) for one device class conveniently, and without the need to use any device description file each time to create each class parameter set.

In some cases, the plurality of class parameter sets (PS) as created could be exported from the plant device management system 1000, and imported into other systems by the device parameter set configuring tool 220, for example, importing into a plant asset management (PAM) system of another plant.

As illustrated in FIG. 1B, the device parameter set manager 200 of the plant device management system 1000 may also include a device template manager 230, which is configured to assign a respective device template to at least one of the registered and non-physical field devices. In some cases, the device template manager 230 is configured to assign a respective device template of the plurality of device templates to at least one of the registered and non-physical plant field devices which are classified to each of the plurality of device classes, wherein the respective device template includes a respective class parameter set (PS). And, the respective class parameter set is associated with a respective device class of the plurality of device classes. As may be understood, a device template described herein includes the contents of, but are not limited to, class parameter sets (PS), document link, plug-in application association etc. Thus, the device template manager 230, which is configured to assign a plurality of device templates to a plurality of registered and non-physical field devices, is able to configure the plurality of registered and non-physical field devices into a plurality of device applications. The above-described configurations will provide advantages in technical view of device configuration of field devices for the industrial plant engineering. Since class parameter sets (PS) included in device templates could be assigned to "registered and non-physical" field devices in "offline" state, which are not physically connected with the process control system in a plant, for example, before those devices will get physically connected with the process control system in a plant. As a result, device commissioning time could be largely reduced after those devices are physically connected or installed in the plant. Consequently, device configuration time and efforts is substantially decreased and minimized.

To implement the above system and configuration, the device template manager 230 includes, but is not limited to, logic to assign a respective device template to at least one registered non-physical plant field device 231. Herein, "non-physical" means the field devices are not physically being connected with the process control systems of a plant; it may further include logic to browse a respective set of registered non-physical plant field devices 232. The device template manager 230 may further include logic to identify a device class among the plurality of device classes 233, logic to browse all of a respective set of registered non-physical plant field devices which match with the device class identified 234, logic to assign each device template to a respective sub-set of one or more registered non-physical plant field devices to be configured for an associated device application 235, and logic to enable downloading of all parameters or one or more flagged parameters of the class parameter set included in the respective device template assigned to one or more physical plant field devices 236.

Through implementing the above system and configuration, the registered and non-physical field devices belong to one device class could be configured into a variety of device applications. By way of an example, one respective class parameter set (PS) included in a respective device template assigned could configure one or more registered and non-physical field device as level transmitter, which is used for level measurement. Another example, another different respective class parameter set (PS) assigned is able to configure another one or more registered and non-physical field devices into flow transmitter for liquid or gas flow measurement.

In some other cases, the device parameter set manager 200 of the plant device management system 1000 may further include a device parameter auditor 240, and the device parameter auditor 240 is configured to compare between parameters of a class parameter set (PS) assigned to the registered and non-physical field devices by the device template manager 230, and corresponding parameters of the class parameter set (PS) from physical field devices installed in the plant, in order for subsequent operations such as replacing parameters of the physical field devices in the plant. Additionally, an audit report which includes the comparison results of parameters could be generated by the device parameter auditor 240.

Furthermore, in some cases, the device parameter auditor 240 is configured to compare between all parameters or one or more flagged parameters of the class parameter set included in the respective device template assigned to one or more registered and non-physical plant field devices, and corresponding parameters of the class parameter set from physical field devices. As will be further appreciated, since the device parameter auditor 240 is configured to compare or audit between the flagged parameters in the respective class parameter set assigned and corresponding parameters of the flagged parameters of the class parameter set (PS) from physical field devices installed in the plant, the auditing efficiency will be improved and ensured.

Figure 2:
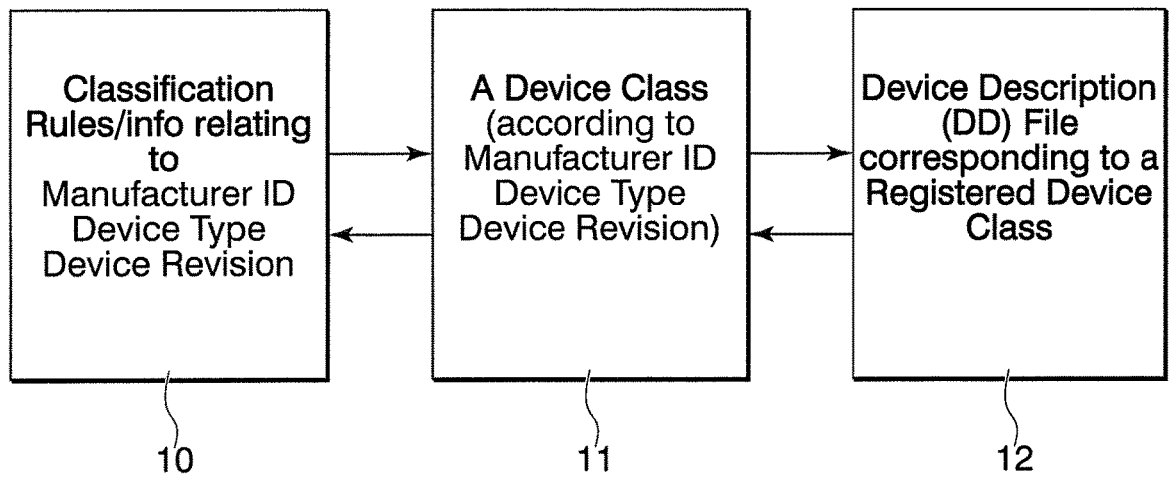
FIG. 2 illustrates the relations and associations among a device class, a device description (DD) file, and classification rules for determining a device class.

Now referring to FIG. 2, a device description (DD) file 12 is associated with or corresponding with a device class 11. Device classes are determined in accordance with a predefined set of classification rules 10 pertaining to a registered field device. In detail, as shown in FIG. 2, device classes 11 may be pre-defined in accordance with, but are not limited to, device manufacturer ID, device type and device revision. Device class could also be pre-defined on the basis of additional information, for instance device communication type. Some exemplary communication types include HART, Foundation Fieldbus, PROFITBUS, etc. In an industrial plant, there could be a plurality of different device classes determined based on, but is not limited to, device manufacturer ID, device type and device revision. And for each registered device class, there will be a device description (DD) file 12 being associated with it.

Figure 3:
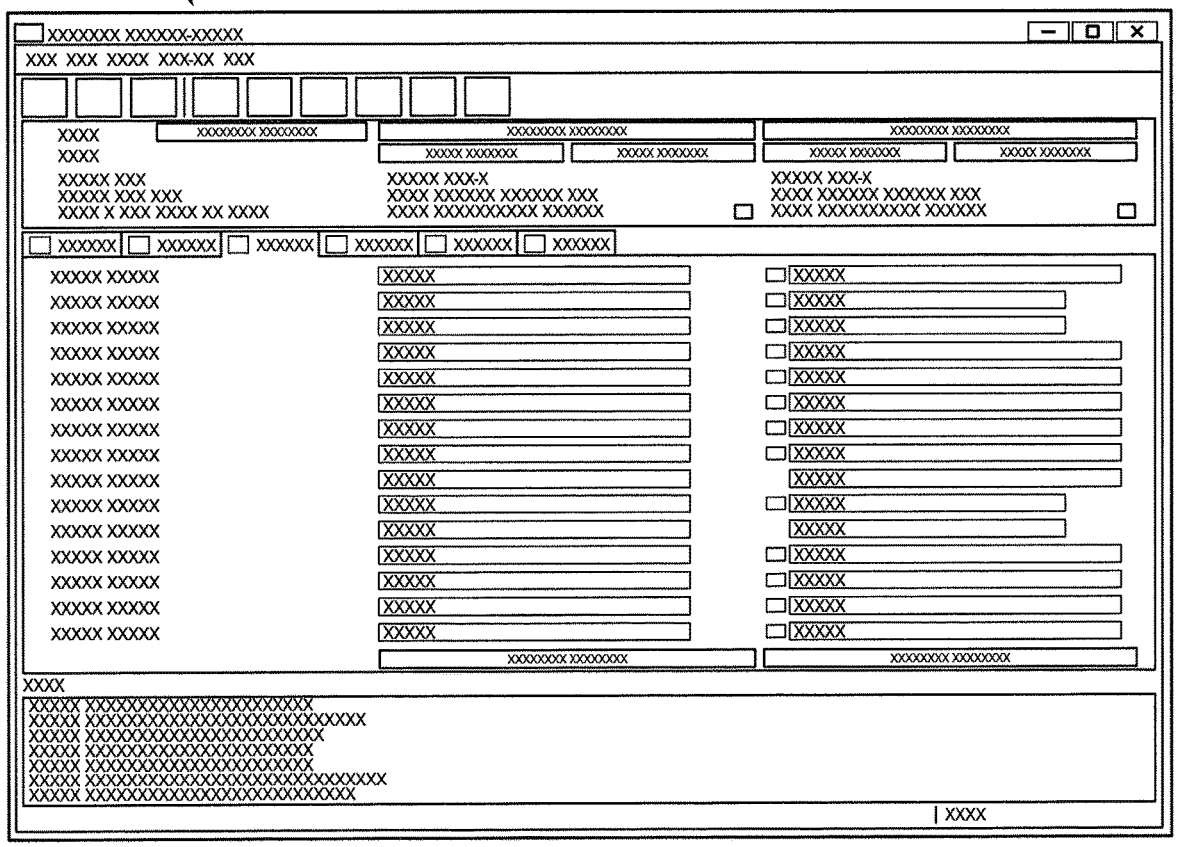
FIG. 3 is an example user interface of the device parameter set configuring tool, which is configured for changing or modifying one or more class parameter sets.

FIG. 3 illustrates an example of an user interface 220a of the device parameter set configuring tool 220, which is configured for changing or modifying one or more class parameter sets (PS) created by the device parameter set creator tool 210. The user interface 220a of the device parameter set configuring tool 220 may be configured to enable indicating or flagging parameters of the one or more class parameter sets (PS), and/or changing parameter values of the class parameter sets (PS) for changing or modifying the one or more class parameter sets (PS). In some cases, indicating or flagging parameters in a class parameter set refers to selecting or marking one or more parameters in a respective class parameter set (PS) as mandatory or critical parameters for engineering and maintenance purposes. By way of an example, typically, there may be dozens of or hundreds of parameters included in a parameter set, while in many cases, it is not necessary to configure all those parameters, but only to configure the flagged parameters for achieving a specific device application. One more example, by flagging or indicating some respective parameters in a class parameter set, modifications made with respect to the parameters of the respective class parameter set could be identified and understood easily. Thus, through indicating or flagging parameters, substantive time and efforts are saved in plant configuration and maintenance.

It could also be understood that, changing or modifying parameter values of a class parameter set could be performed by using the user interface 220a of the device parameter set configuring tool 220 as shown in the figure as well.

The described user interface 220a of the device parameter set configuring tool 220 is also configured to enable saving a modified class parameter set (PS), which was obtained through changing or modifying the one or more parameters of a class parameter sets (PS). As a result, the above described operations advantageously make it possible to create and save a plurality of class parameter sets (PS), and the plurality of class parameter sets can have different flagged parameters and parameter values, respectively.

Figure 4A:
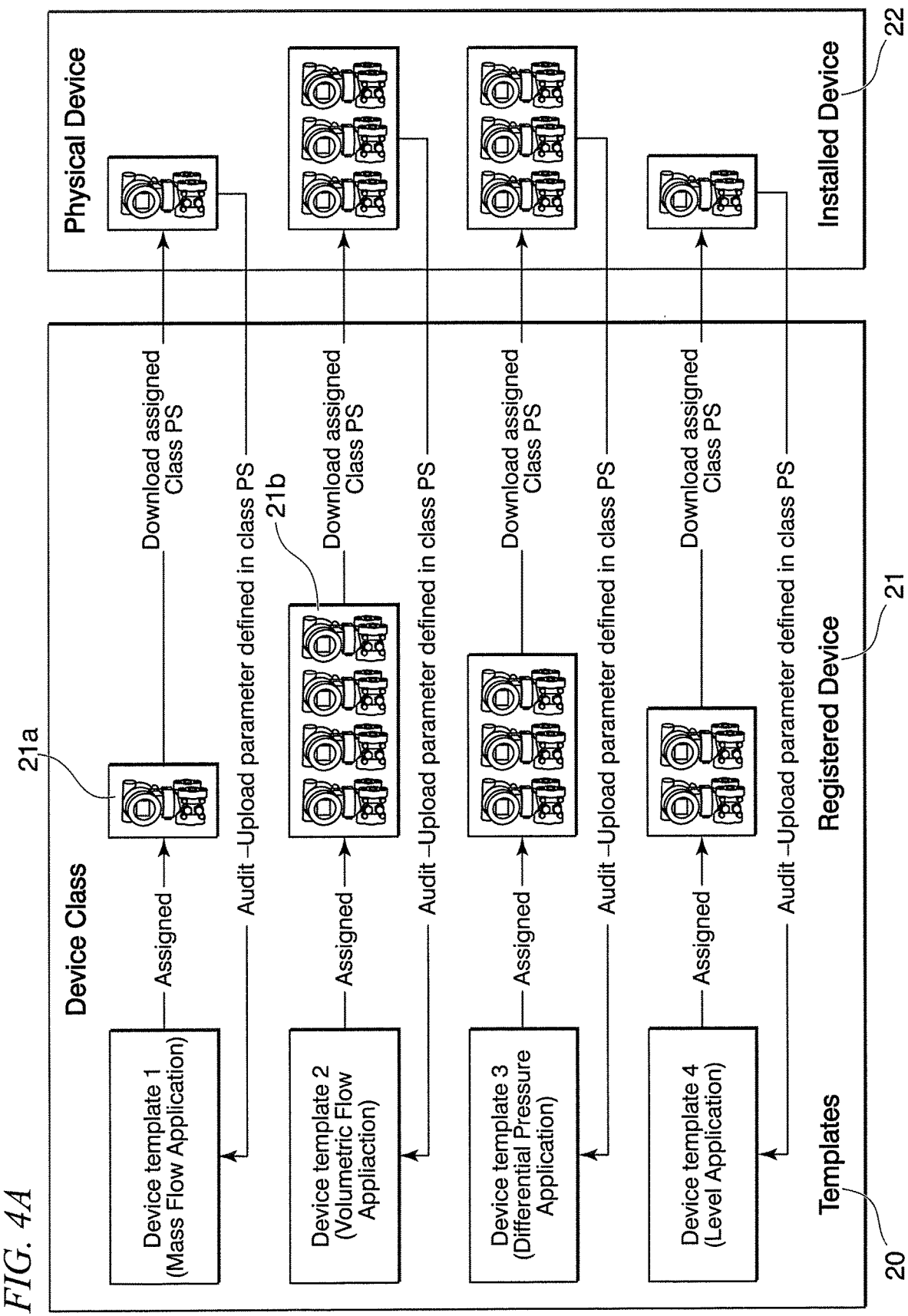
FIG. 4A illustrates some of the functions and operations of a plant device management system, according to one or more embodiments.

FIG. 4A illustrates some of the exemplary functions and operations of the disclosed plant device management system 1000. In some cases, the functions and operations include, but are not limited to, assigning a plurality of device templates 20 which include class parameter sets (PS) to a plurality sub-sets of registered and non-physical field devices 21 by the device template manager 230; downloading the class parameter sets (PS) of the device templates assigned by physical plant field devices 22. Furthermore, the operation of auditing is depicted, which compares between parameters of the class parameter sets (PS) assigned to the registered and non-physical field devices 21, and corresponding parameters of the class parameter sets (PS) from physical plant field devices 22 installed in the plant by the device parameter auditor 240.

By way of an example as shown in the figure, there are four device templates 20, device template 1, device template 2, device template 3 and device template 4, respectively. And each respective device template 20 includes a respective class parameter set (PS), which are to be assigned to a plurality sub-sets of registered and non-physical field devices. As an example, the registered and non-physical field devices are transmitters 21, the transmitters are registered with the plant asset management (PAM) system, but have not been physically connected with the process control systems in a plant. The registered and non-physical transmitters 21 are to be configured into specific device applications, based upon the device templates assigned which include the respective class parameter sets (PS). For example, as presented in the figure, a first sub-set of transmitters 21a including only one transmitter will be configured as a mass flow transmitter, which measures the amount of mass of a substance passing through a device for a given amount of time, based on the respective class parameter set assigned. On the other hand, a second sub-set of transmitters 21b, which includes four transmitters, will be configured as volumetric flow transmitters based on the respective class parameter set assigned, to measure the volume of a substance through a device over a given period.

It is to be noted that, the device templates including class parameter sets assigned may be downloaded by the plurality of physical plant field devices simultaneously, thus bulk downloading and commissioning is achieved and saving enormous amount of commissioning time.

Referring again to FIG. 4A, class parameter sets (PS) assigned will be downloaded by the physical devices 22 installed in the plant. During device operation, the device parameter auditor 240 is configured to acquire and upload parameter information from the physical field devices, which corresponds to the class parameter set assigned, and compare between parameters of the class parameter set (PS) assigned to the registered and non-physical field devices 21, and the uploaded parameter information from the physical field devices installed in the plant 22. Particularly, in some cases, only the parameters corresponding to the flagged or indicated parameters in the respective class parameter set (PS) assigned will be uploaded from the physical devices 22. And, the device parameter auditor 240 is configured to compare between only the flagged or indicated parameters in the respective class parameter set assigned, and corresponding parameters of the class parameter set (PS) from physical field devices 22 installed in the plant. The comparison results could help users to determine whether to replace or change the corresponding parameters of the class parameter set (PS) of a physical field device, for field device monitoring and maintenance operations.

Thus, the audit function or operation could be performed by comparing between all the corresponding parameters of the class parameter set (PS) from physical field devices, and all the parameters of the class parameter set (PS) assigned. In some other cases, the audit function could also be performed by comparing between only the corresponding flagged or indicated parameters of the class parameter set (PS) from physical field devices, and only the flagged or indicated parameters of the class parameter set (PS) assigned by the device template manager.

As will be further appreciated, the audit function, is not limited to, comparing corresponding parameters of the class parameter set from physical filed devices against only with the class parameter set (PS) assigned. In some of the embodiments, the audit function is to be performed by comparing between corresponding parameters of the class parameter set from physical filed devices against with other class parameter sets (PS) that belong to the same device class.

In addition, the audit function or operation as described in FIG. 4A could be performed "on the fly", wherein the acquired parameter information with respect to corresponding parameters of the class parameter set from physical devices, and the class parameter set assigned, are compared directly and without the need of saving the acquired parameters as parameter set.

Figure 4B:
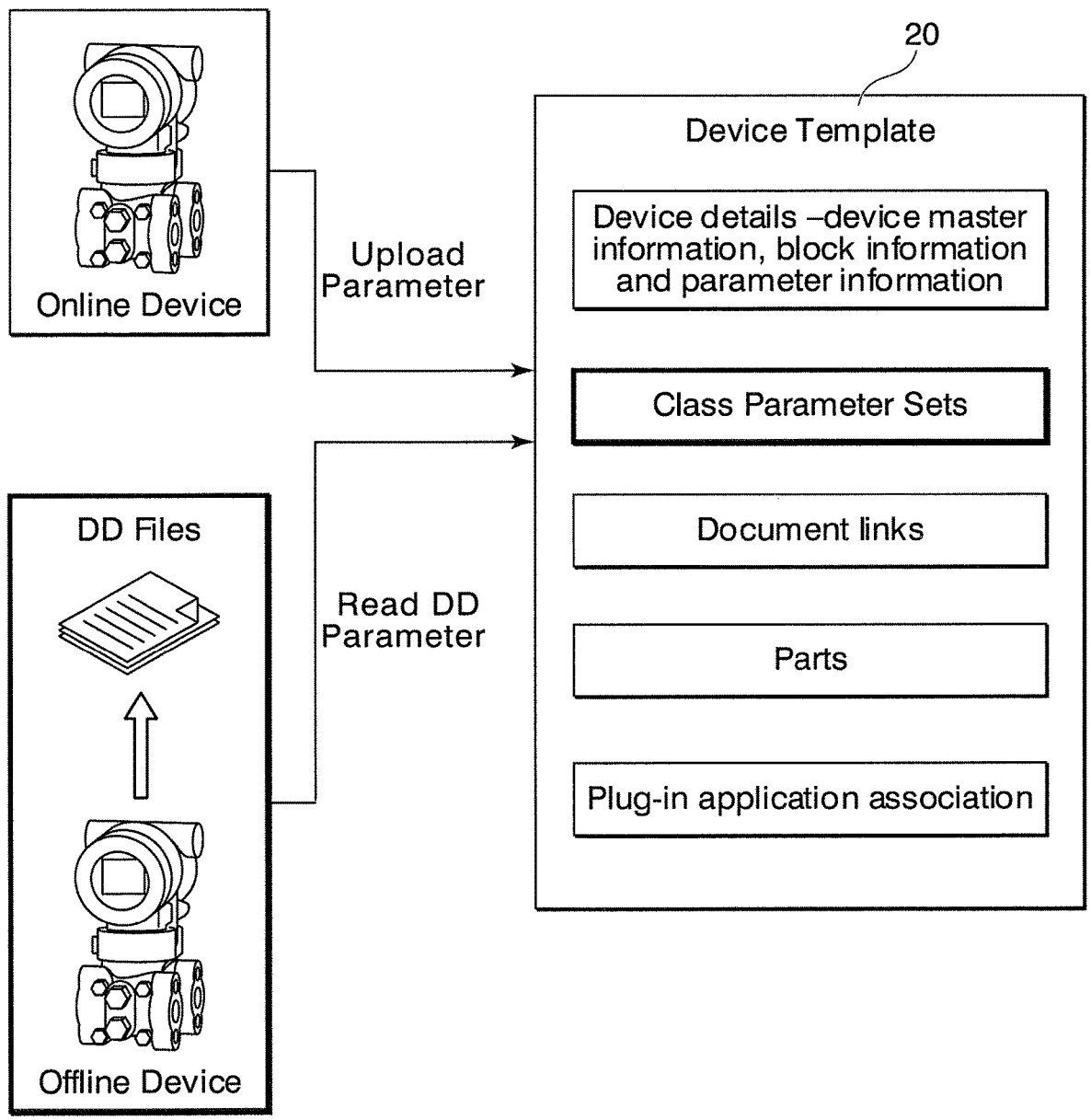
FIG. 4B illustrates some of the contents that are comprised in a device template.

Referring to FIG. 4B, contents that are included in a device template 20 are depicted. The contents comprised in the device template 20 include, but are not limited to, device details, document links, parts, plug-in application association, as well as class parameter set (PS), which has been primarily discussed in the present disclosure. According to one or more of the present embodiments, class parameter sets (PS) may be created by using, but is not limited to, device description (DD) files of "offline" devices, also be referred to as "registered and non-physical" devices. Additionally, as shown in the figure, class parameter sets (PS) could also be obtained from "online" devices, which are physically connected with the process control systems of a plant. For "online" devices, class parameter sets (PS) are created on the basis of the latest parameter set obtained and uploaded from "online" devices.

Figure 5:
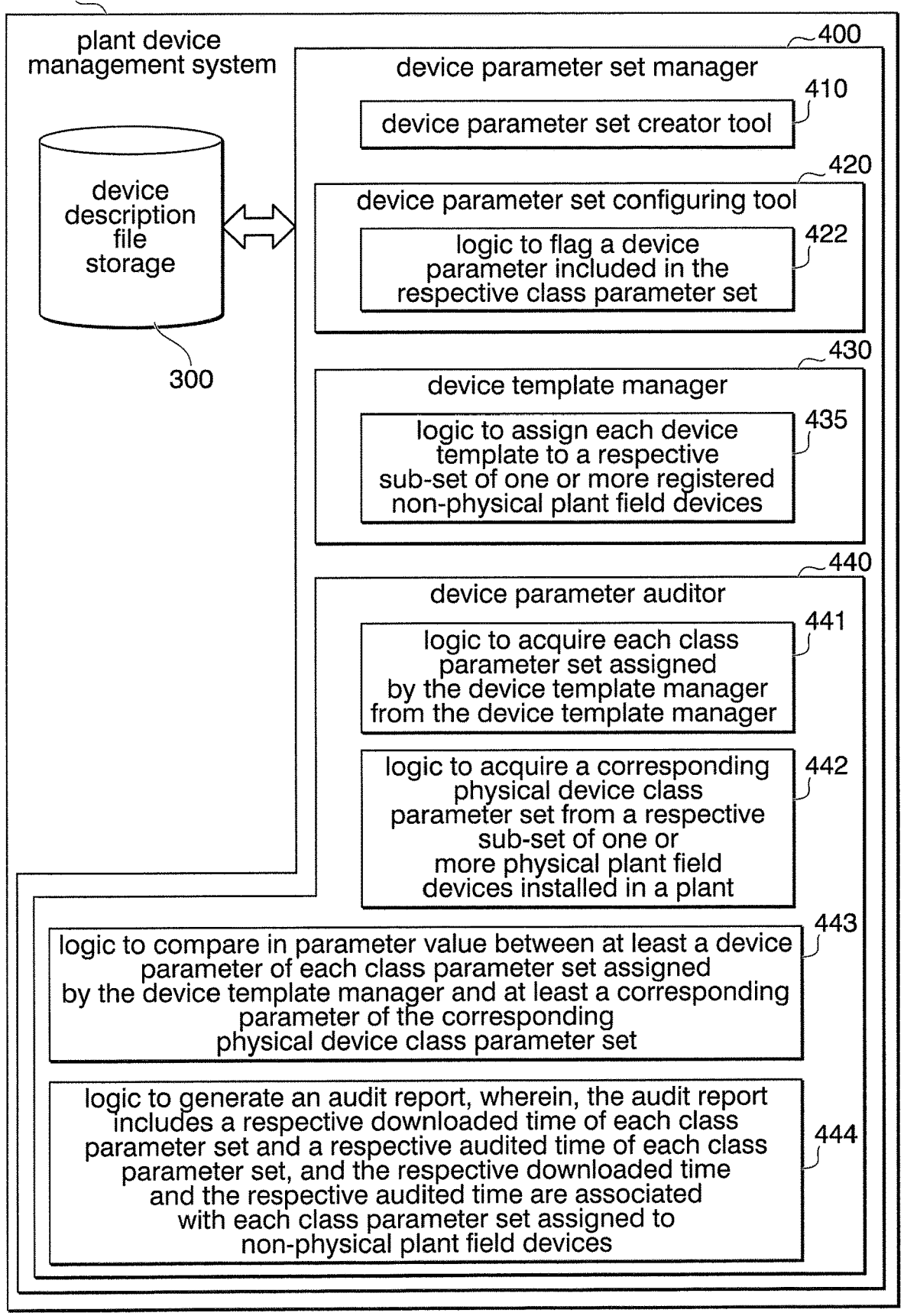
FIG. 5 illustrates a block diagram of another example of a plant device management system, according to one or more embodiments.

FIG. 5 illustrates another exemplary plant device management system 3000 according to one or more embodiments. As shown in FIG. 5, the plant device management system 3000 includes a device description file storage 300 and a device parameter set manager 400. The device description file storage 300 is configured to store a plurality of device description (DD) files including parameters and parameter values.

As shown, the device parameter set manager 400 of the plant device management system 3000 may include a device parameter set creator tool 410, which is configured to create one or more class parameter sets (PS) for one device class using the device description (DD) files in the device description file storage 300. And each device description (DD) file is associated with a respective device class, which is predefined in accordance with some classification rules. The device parameter set creator tool 410 is configured to communicate with or access to the device description file storage 300 to acquire and interpret the device description (DD) files from the device description file storage 300 for extracting parameters and default values of the parameters from the device description (DD) files of "offline" field devices. The device parameter set creator tool 410 is configured to create one or more class parameter sets (PS) for one device class using the device description files, wherein the one or more class parameter sets each include a plurality of parameters and parameter values. Herein, a device description file parser may be used to interpret the device description (DD) files according to IEC 61804-3 standards, for extracting parameters and default values of the parameters, and creating one or more class parameter sets (PS).

In some cases, the device parameter set manager 400 of the plant device management system 3000 may also include a device parameter set configuring tool 420, which is configured to enable changing or modifying one or more class parameter sets (PS) created by the device parameter set creator tool 410. The device parameter set configuring tool 420 is configured to indicate or flag parameters of the one or more class parameter sets (PS) 422 as mandatory or critical, and/or to change parameter values of the class parameter sets (PS) for changing or modifying the one or more class parameter sets (PS). As described earlier, the changed or modified one or more class parameter sets (PS) could also be saved as a new class parameter set (PS) for the same device class. Consequently, it is convenient to have a plurality of class parameter sets (PS) using the above described operation, which has eliminated the need to create class parameter set using device description files each time.

As illustrated in FIG. 5, the device parameter set manager 400 of the plant device management system 3000 may also include a device template manager 430, which is configured to include logic to assign each device template to a respective sub-set of one or more registered and non-physical field devices 435, wherein, the respective each device template includes a respective class parameter set (PS). The device template manager 430, which is configured to assign each device template to a respective sub-set of one or more registered and non-physical field devices, is able to configure the one or more registered and non-physical field devices into a device application. Some examples of the device applications may include, but are not limited to, level transmitter, flow transmitter and pressure transmitter, which are used for monitoring variables in industrial automation and process controls.

In some other cases, the device parameter set manager 400 of the plant device management system 3000 may further include a device parameter auditor 440, which is configured to compare between parameters of a class parameter set (PS) assigned to the registered and non-physical field devices by the device template manager 430, and corresponding parameters of the class parameter set (PS) from physical field devices installed in the plant. Additionally, the device parameter auditor 440 is configured to include logic 444, which is utilized to generate an audit report that includes the downloading time of the class parameter set assigned and the audited time of the class parameter set. The audit report provided by the device parameter auditor 440 is to determine whether there is a need to replace or change parameters for the physical field devices, for operational compliance and maintenance operations in the industrial plant engineering. In other words, the device parameter auditor 440 is designed in technical view to provide the significant information of at least both the downloading time of the class parameter set assigned and the audited time of the class parameter set, which is informative to determine whether there is a need to replace or change parameters for the physical field devices, for operational compliance and maintenance operations in the industrial plant engineering.

The device parameter auditor 440 is further configured to include logic to acquire each class parameter set assigned 441, logic to acquire a corresponding physical device class parameter set 442, and logic to compare parameter values between at least a device parameter of each class parameter set assigned and at least a corresponding parameter of the corresponding physical device class parameter set 443.

Furthermore, in some cases, the device parameter auditor 440 is configured to compare between all parameters or one or more flagged parameters of the class parameter set included in the respective device template assigned to one or more registered and non-physical plant field devices, and corresponding parameters of the class parameter set from physical field devices.

Additionally, the device parameter auditor 440, is configured not only to compare corresponding parameters of the class parameter set from physical filed devices against only with the class parameter set (PS) assigned, but also it is configured to compare corresponding parameters of the class parameter set from physical filed devices against with other class parameter sets (PS) that belong to the same device class.

Figure 6:
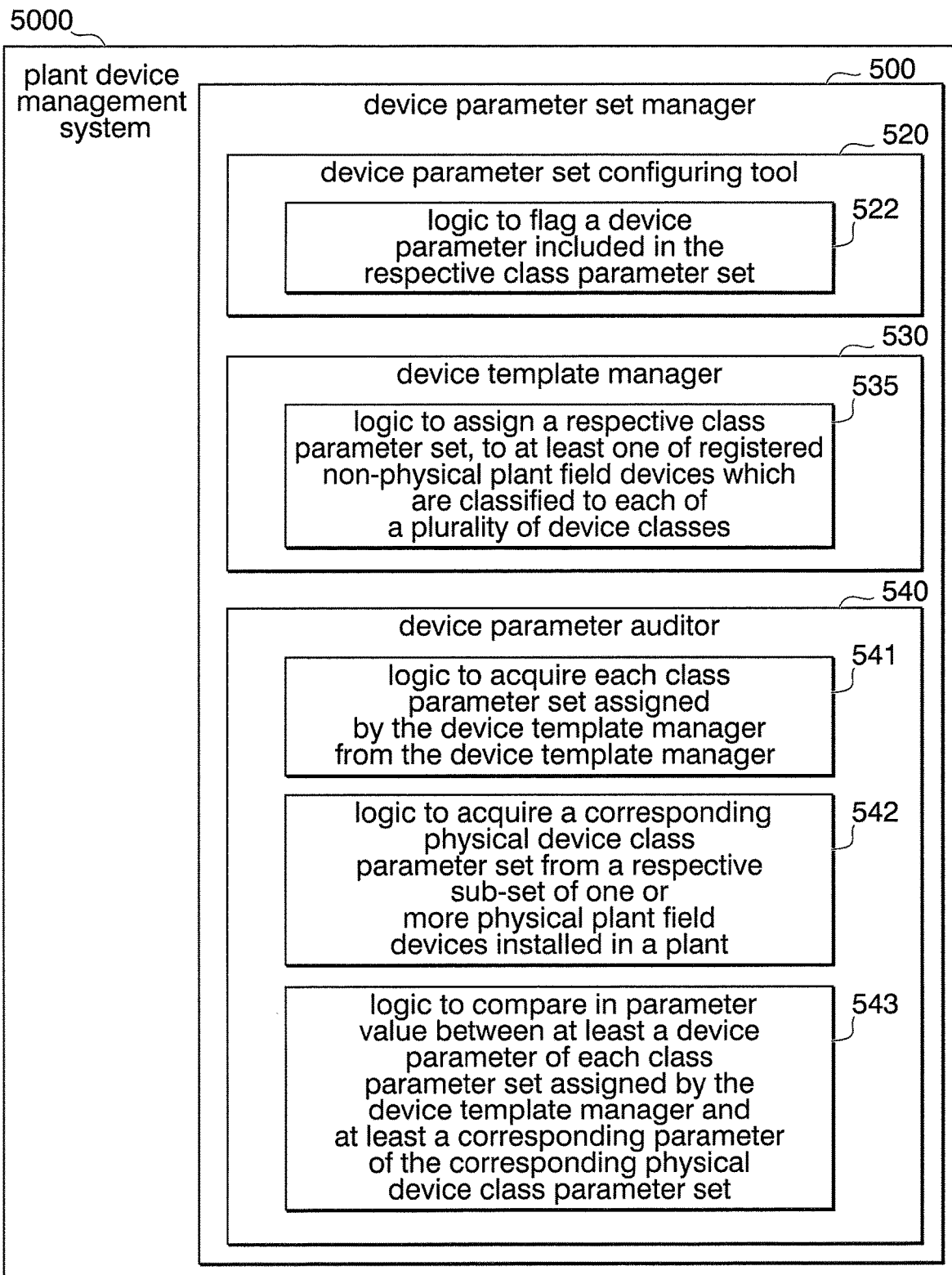
FIG. 6 shows a block diagram of still another example of a plant device management system, according to one or more embodiments.

FIG. 6 illustrates another exemplary plant device management system 5000 according to one or more embodiments. As shown in FIG. 6, the plant device management system 5000 includes a device parameter set manager 500.

The device parameter set manager 500 of the plant device management system 5000 includes a device template manager 530, which is configured to include logic to assign a respective class parameter set (PS) to at least one of registered and non-physical field devices 535. The device template manager 530, which is configured to assign a respective class parameter set (PS) to at least one of registered and non-physical field devices, provides the ability to configure the at least one of the registered and non-physical field devices into a device application, for instance, a level transmitter for determining the level of a given liquid or bulk-solid at any given time.

Furthermore, the device parameter set manager 500 of the plant device management system 5000 includes a device parameter auditor 540, and the device parameter auditor 540 is configured to compare between parameters of a class parameter set (PS) assigned to the registered and non-physical field devices by the device template manager 530, and corresponding parameters of the class parameter set (PS) from physical field devices installed in the plant. Further, the device parameter auditor 540 may also include logic, which is configured to generate an audit report, which includes the downloading time of the class parameter set assigned and the audited time of the class parameter set, for determining whether to replace or change parameters for the physical field devices, during operational compliance and maintenance operations. In other words, the device parameter auditor 540 is designed in technical view to provide the significant information of at least both the downloading time of the class parameter set assigned and the audited time of the class parameter set, which is informative to determine whether there is a need to replace or change parameters for the physical field devices, for operational compliance and maintenance operations in the industrial plant engineering.

The device parameter auditor 540 is further configured to include logic to acquire each class parameter set assigned 541, logic to acquire a corresponding physical device class parameter set 542, and logic to compare parameter values between at least a device parameter of each class parameter set assigned, and at least a corresponding parameter of the corresponding physical device class parameter set 543.

As will be further appreciated, the device parameter auditor 540, is configured not only to compare corresponding parameters of the class parameter set from physical filed devices against only with the class parameter set (PS) assigned, it is also configured to compare corresponding parameters of the class parameter set from physical filed devices against with other class parameter set (PS) that belong to the same device class.

In some cases, the device parameter set manager 500 of the plant device management system 5000 may further include a device parameter set configuring tool 520, which is configured to enable changing or modifying one or more class parameter sets (PS). Particularly, the device parameter set configuring tool 520 is configured to include logic to flag parameters included in the respective one or more class parameter sets (PS) 522, and/or to change parameter values of the class parameter sets (PS) for changing or modifying the one or more class parameter sets (PS).

Figure 7A:
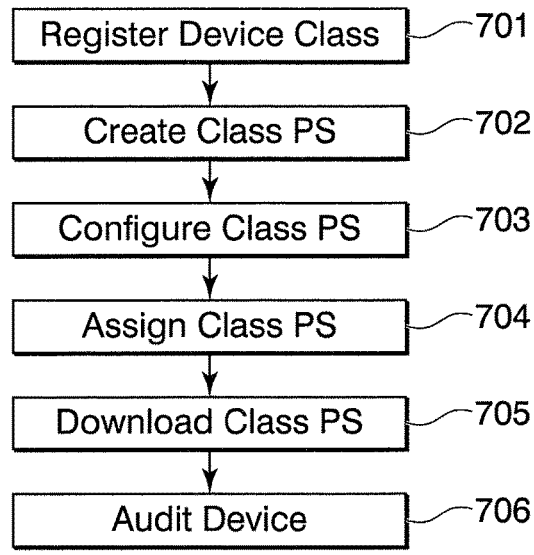
FIG. 7A illustrates a life cycle of class parameter set (PS) management, according to one or more embodiments.

FIG. 7A illustrates the life cycle of class parameter set (PS) management, which includes, but is not limited to, register device class 701, create class parameter set (PS) 702, configure class parameter set 703, assign class parameter set 704, download class parameter set 705, and audit device 706 using class parameter set. In detail, as described earlier, registration of a device class 701 refers to have the field device defined by a plant asset management (PAM) system based upon vendor, model and revision of the field device, but not physically connected to the process control systems. After registration of the device class 701, one or more class parameter sets (PS) will be created in the life cycle stage of create class parameter set (PS) 702. The created one or more class parameter sets then are to be configured in the life cycle stage of configure class parameter set 703. Subsequently, the configured one or more class parameter sets (PS) are to be assigned to one or more registered and non-physical plant field devices 704. The one or more class parameter sets assigned will be downloaded by physical plant field devices 705. Finally, physical devices will be audited 706, wherein, parameters of a class parameter set (PS) assigned to the registered and non-physical field devices, and corresponding parameters of the class parameter set (PS) from physical field devices installed in the plant will be acquired and then compared, for operation compliance and maintenance purposes.

Figure 7B:
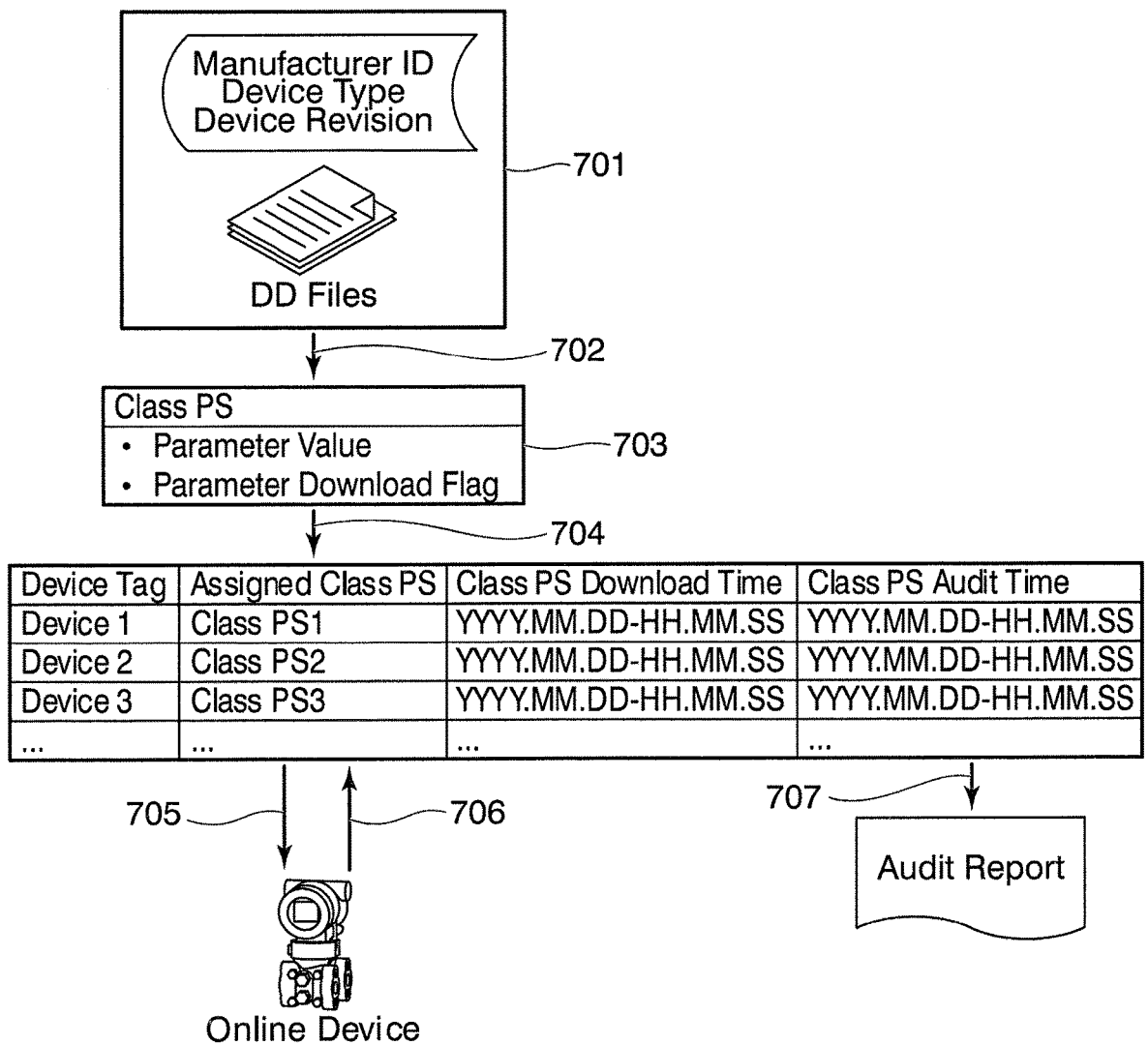
FIG. 7B further illustrates the details of the life cycle of class parameter set (PS) management.

FIG. 7B illustrates the life cycle of class parameter set (PS) management with exemplary relevant contents in each stage of the life cycle. By way of an example, in register a device class 701, a corresponding device description (DD) file will be associated with it, and the corresponding device description (DD) file may be then utilized for creating class parameter sets (PS) 702. The created class parameter sets (PS) may be configured 703 by changing parameter values and/or flagging some parameters in the class parameter sets created. In the stage of assign class parameter set 704, the configured class parameter sets will be assigned to registered and non-physical devices to configure the devices. And the class parameter sets assigned are to be downloaded by physical plant field devices 705. In the following, parameters of a class parameter set (PS) assigned to the registered and non-physical field devices, and corresponding parameters of the class parameter set (PS) from physical field devices installed in the plant (i.e. "online" device), are to be acquired and compared in the stage of audit device 706. Additionally, an audit report that includes the downloading time of the class parameter set assigned, and the audited time of the class parameter set associated with devices, will be generated and shown. In other words, the stage of audit device 706 is designed in technical view to provide the significant information of at least both the downloading time of the class parameter set assigned and the audited time of the class parameter set, which is informative to determine whether there is a need to replace or change parameters for the physical field devices, for operational compliance and maintenance operations in the industrial plant engineering.

Figure 7C:
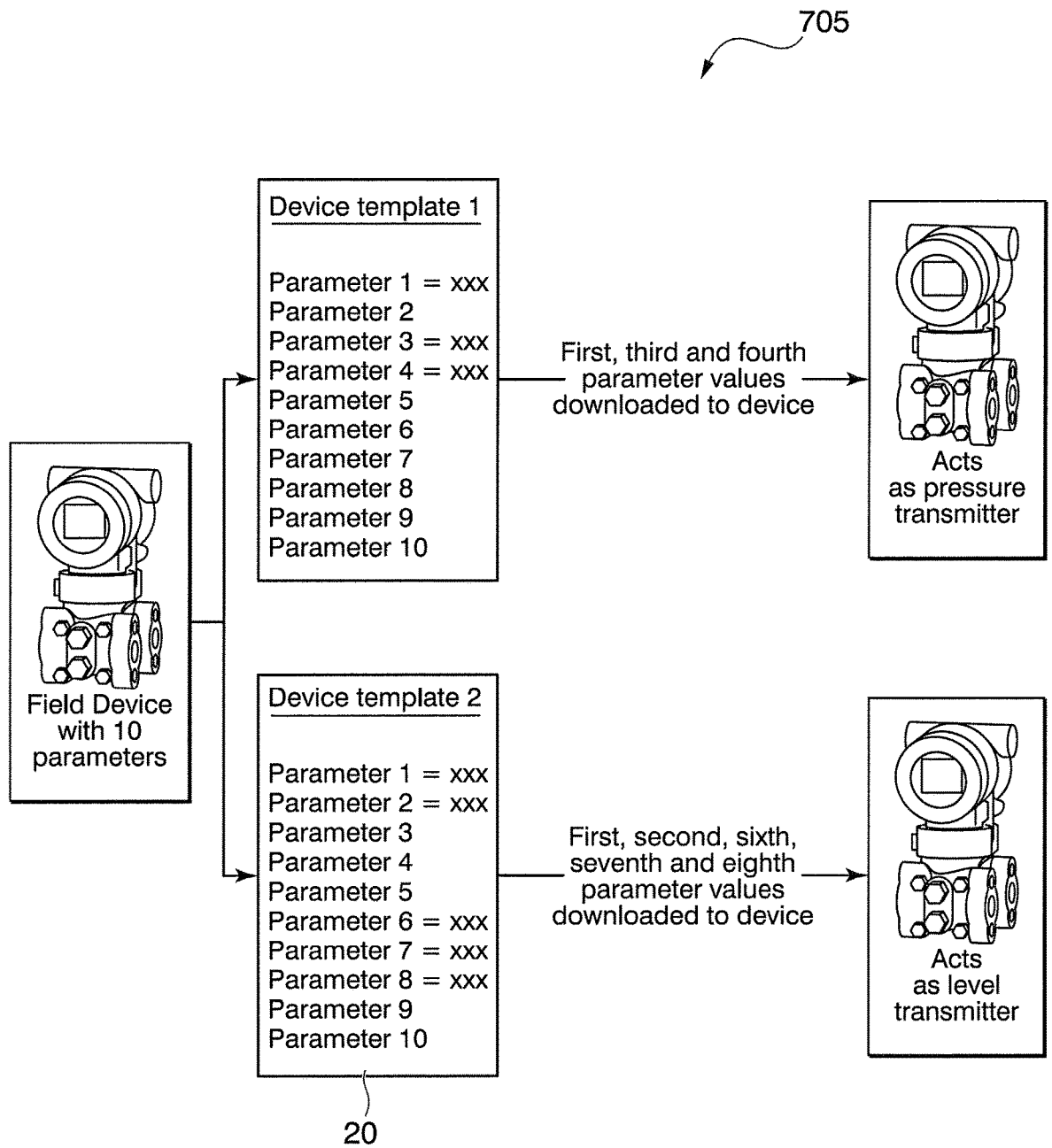
FIG. 7C further illustrates download class parameter set in the life cycle of class parameter set (PS) management.

In particular, FIG. 7C illustrates the life cycle stage of download class parameter set 705 in detail, in which, respective class parameter set (PS) included in a device template is downloaded by physical plant field devices. As depicted in the figure, the respective class parameter set which comprises three parameters (i.e. parameter 1, parameter 3 and parameter 4) included in device template 1 is downloaded by a physical plant field device, and the subject physical plant field device will work as a pressure transmitter. One more example, another respective class parameter set which comprises five parameters (i.e. parameter 1, parameter 2, parameter 6, parameter 7 and parameter 8) included in device template 2 is downloaded by another physical plant field device, consequently the physical plant field device will become a level transmitter.

As will be further appreciated, the respective class parameter set could be downloaded by a plurality of physical plant field devices simultaneously, thus bulk downloading and commissioning is achieved, and commissioning time could be reduced largely.

Figure 8:
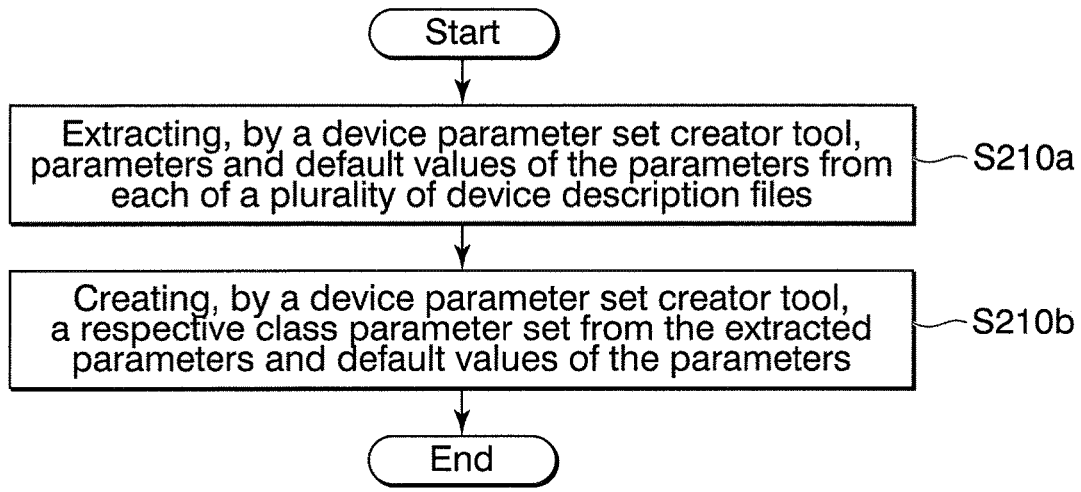
FIG. 8 is a flowchart of an example of creating class parameter set (PS).

FIG. 8 has shown a flowchart of an example of creating class parameter set (PS) according to some of the embodiments. In detail, in step S201a, parameters and default values of the parameters from each of a plurality of device description files are extracted by the device parameter set creator tool. In step S201b, a respective class parameter set is created from the extracted parameters and the default values of the parameters by the device parameter set creator tool.

Figure 9:
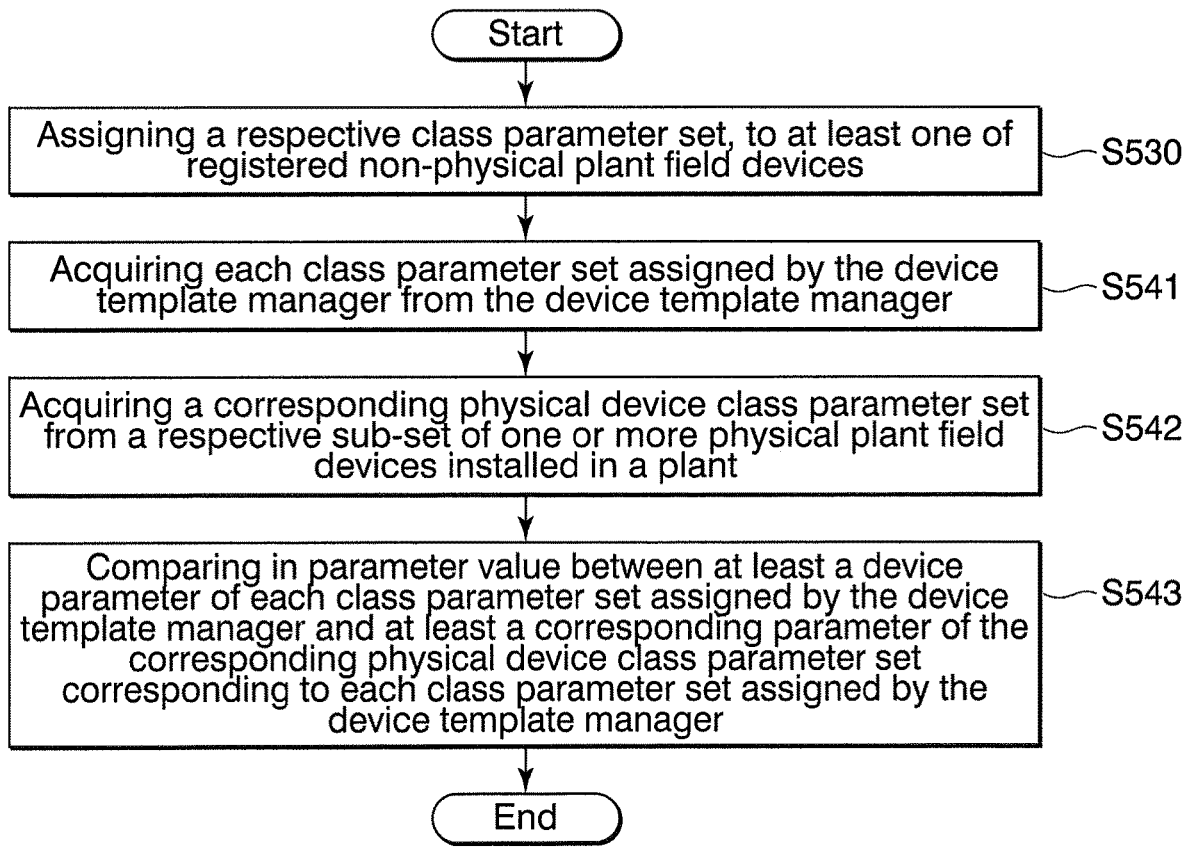
FIG. 9 is a flowchart relating to an exemplary audit operation, wherein parameters in class parameter set (PS) are compared and audited, according to one or more embodiments.

FIG. 9 illustrates a flowchart of an exemplary audit operation according to some of the embodiments of the disclosure, in which parameters in class parameter sets (PS) are compared and audited. In detail, in step S530, a respective class parameter set is assigned by the device template manager 530, to at least one of registered and non-physical plant field devices. In step S541, the device parameter auditor 540 acquires each class parameter set assigned by the device template manager 530. And in step S542, the device parameter auditor 540 acquires a corresponding physical device class parameter set from a respective sub-set of one or more physical plant field devices installed in a plant. In the following, in step S543, the device parameter auditor 540 compares parameter value between at least a device parameter of each class parameter set assigned, and at least a corresponding parameter of the corresponding physical device class parameter set corresponding to each class parameter set assigned by the device template manager 530.

Figure 10:
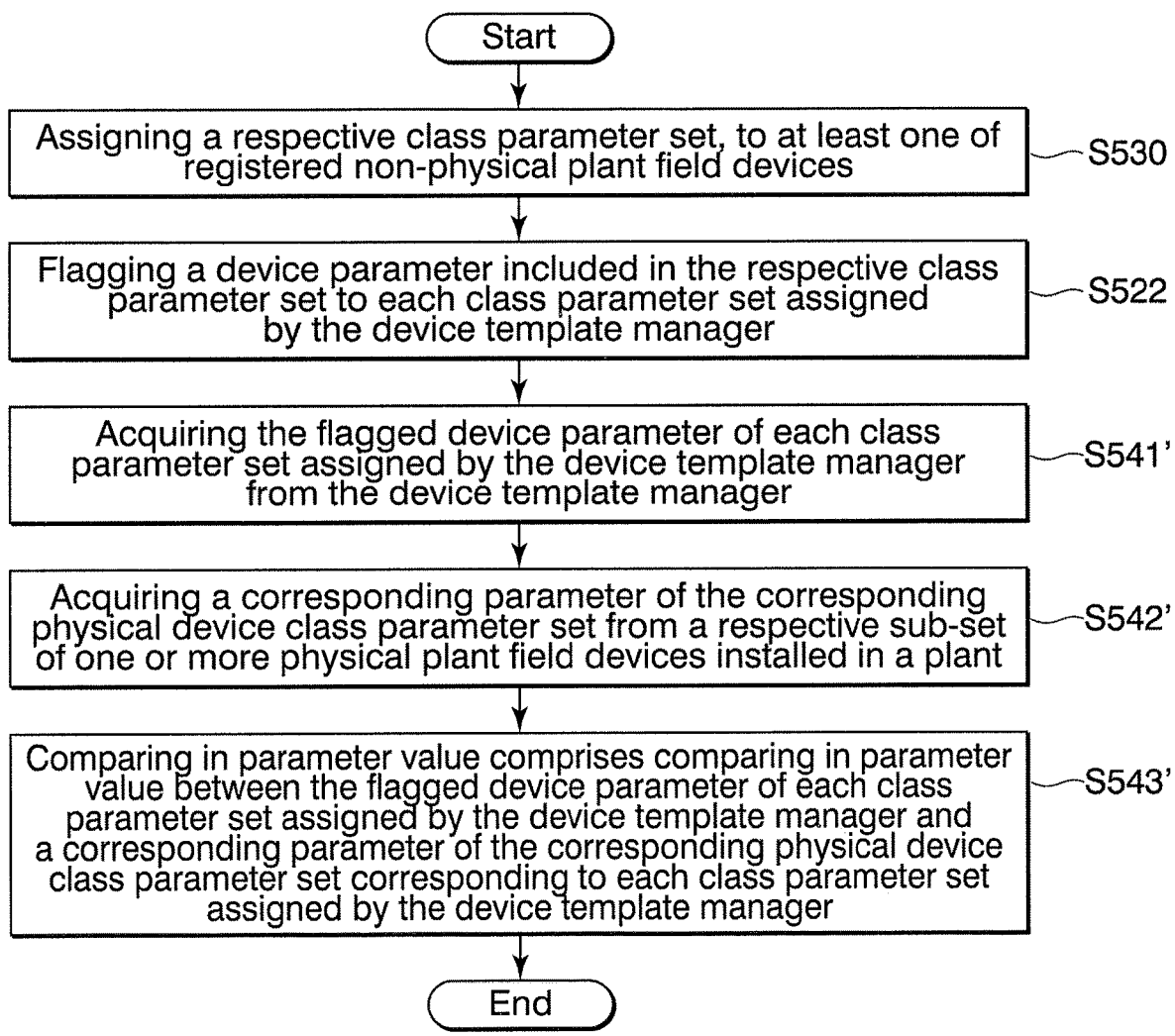
FIG. 10 a flowchart of another example of audit operation, wherein flagged parameters in class parameter set (PS) are compared and audited, according to one or more embodiments.

FIG. 10 is a flowchart of an exemplary audit operation according to some of the embodiments, in which flagged parameters in a class parameter set (PS) are compared and audited. In step S530, the device template manager 530 assigns a respective class parameter set, to at least one of registered non-physical plant field devices. In step S522, the device parameter set configuring tool 520 flags a device parameter included in the respective class parameter set to each class parameter set assigned by the device template manager 530. In step S541', the device parameter auditor 540 acquires the flagged device parameter of each class parameter set assigned by the device template manager 530 from the device template manager. And in step S542', the device parameter auditor 540 acquires a corresponding parameter of the corresponding physical device class parameter set from a respective sub-set of one or more physical plant field devices installed in a plant. In step S543', the device parameter auditor 540 compares parameter value between the flagged device parameter of each class parameter set assigned by the device template manager 530, and a corresponding parameter of the corresponding physical device class parameter set corresponding to each class parameter set assigned by the device template manager 530.

As will be further appreciated, since it enables to compare or audit between the flagged parameters in the respective class parameter set assigned and corresponding parameters of the corresponding class parameter set (PS) from physical field devices installed in the plant, auditing efficiency could be improved, and operational compliance ensured.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

What is claimed is:

1. A plant device management system comprising:
a) a device description the storage that stores a plurality of device description files, each of the plurality of device description files describing device parameters and default parameter values for a respective registered plant field device, each of the plurality of device description files being associated with a respective device class of a plurality of device classes for classifying a plurality of registered plant field devices, wherein the plurality of device classes is defined by a predefined set of classification rules related to a plurality of registered plant field devices, the predefined set of classification rules is defined by an identification which identifies a field device manufacturer; a field device type: and a plant field device revision;
a computer;
a memory storing program code which, when executed by the computer, causes the computer to implement;
b) a device parameter set manager communicatively coupled to the device description the storage, the device parameter set manager comprising:

b-1) a device parameter set creator tool configured to:
extract parameters and default values of the parameters from each of a plurality of device description files associated with a single device class, and
create a respective class parameter set for the single device class from the extracted parameters and default values of the parameters of the plurality of device description files associated with the single device class;
b-2) a device parameter set configuring tool is configured to configure the respective class parameter set, the device parameter set configuring tool comprises:
b-2-1) logic to change a device parameter value of a device parameter included in the respective class parameter set; and
b-2-2) logic to flag a device parameter included in the respective class parameter set; and
b-3) a device template manager configured to manage, for each of the plurality of device classes, a plurality of device templates,
each of the plurality of device templates comprising:
a device master information, block information, parameter information, document links, plug-in application associations, and a plurality of different class parameter sets being respectively associated with a plurality of different device applications of a plant field device belonging to a device class of the plurality of device classes,
wherein the device template manager comprises:
b-3-1) logic to assign a respective device template, which includes a respective class parameter set, to at least one of registered non-physical plant field devices which are classified to each of the plurality of device classes, and
b-3-2) logic to browse a respective set of registered non-physical plant field devices which match with each of the plurality of device classes.

2. The plant device management system according to claim 1, wherein
b-1) the device parameter set creator tool further comprises:
b-1-1) a device description file parser configured to interpret a format of each of the device description files based on an IEC standard, for extracting the parameters and the default values of the parameters from each of the plurality of device description files.

3. The plant device management system according to claim 1, wherein the plurality of device description files is defined by an IEC standard.

4. The plant device management system according to claim 1, wherein
b-3) the device template manager further comprises:
b-3-3) logic to identify a device class among the plurality of device classes;
b-3-4) logic to browse all of a respective set of registered non-physical plant field devices which match with the device class identified; and
b-3-5) logic to assign each device template to a respective sub-set of one or more registered non-physical plant field devices to be configured for an associated device application of one or more plant field devices among the plurality of device applications.

5. The plant device management system according to claim 4, wherein b-3) the device template manager further comprises:
b-3-6) logic to enable downloading of all parameters or one or more flagged parameters of the class parameter set included in the respective device template assigned to one or more physical plant field devices, wherein the one or more physical plant field devices to be configured as a corresponding device application.

6. The plant device management system according to claim 1, wherein
b-3) the device template manager further comprises:
b-3-5) logic to assign each class parameter set of each device template to a respective sub-set of one or more registered non-physical plant field devices to be configured for an associated device application of one or more plant field devices among the plurality of device applications; and
b) the device parameter set manager further comprises:
b-4) a device parameter auditor further comprising:
b-4-1) logic to acquire each class parameter set assigned by the device template manager from the device template manager;
b-4-2) logic to acquire a corresponding physical device class parameter set from a respective sub-set of one or more physical plant field devices installed in a plant, wherein the corresponding physical device class parameter set corresponds to each class parameter set assigned by the device template manager; and
b-4-3) logic to compare in parameter value between at least a device parameter of each class parameter set assigned by the device template manager and at least a corresponding parameter of the corresponding physical device class parameter set corresponding to each class parameter set assigned by the device template manager.

7. The plant device management system according to claim 6, wherein
b-2) the device parameter set configuring tool further comprises:
b-2-2) logic to flag a device parameter included in the respective class parameter set, and
wherein b-4) the device parameter auditor further comprises:
b-4-3') logic to compare in parameter value between the flagged device parameter of each class parameter set assigned by the device template manager and the at least a corresponding parameter of the corresponding physical device class parameter set corresponding to each class parameter set assigned by the device template manager.

8. The plant device management system according to claim 7, wherein b-4) the device parameter auditor further comprises:
b-4-4) logic to generate an audit report, wherein, the audit report includes a respective downloading time of the class parameter set assigned and a respective audited time of the class parameter set, and the respective downloading time and the respective audited time are associated with the class parameter set assigned to the one or more non-physical plant field devices.

9. The plant device management system according to claim 1, wherein
b) the device parameter set manager further comprises:
b-4) a device parameter auditor further comprising:
b-4-3) logic to compare in parameter value between at least a device parameter of each class parameter set assigned by the device template manager and at least a corresponding parameter of the corresponding physical device class parameter set corresponding to each class parameter set assigned by the device template manager.

10. A plant device management system comprising a memory storing program code which, when executed by a computer, causes the computer to implement:

b) a device parameter set manager comprising:
b-1) a device parameter set creator tool configured to: extract parameters and default values of the parameters from each of a plurality of device description files associated with a single device class, each of the plurality of device description files describing device parameters and default parameter values for a respective registered plant field device, each of the plurality of device description files being associated with a respective device class of a plurality of device classes for classifying a plurality of registered plant field devices, and the plurality of device classes being defined by a predefined set of classification rules related to a plurality of registered plant field devices, the predefined set of classification rules being defined by an identification which identifies a field device manufacturer; a field device type; and a plant field device revision; and
create a respective class parameter set for the single device class from the extracted parameters and default values of the parameters of the plurality of device description files associated with the single device class;
b-2) a device parameter set configuring tool is configured to configure the respective class parameter set, the device parameter set configuring tool comprising:
b-2-1) logic to change a device parameter value of a device parameter included in the respective class parameter set; and
b-2-2) logic to flag a device parameter included in the respective class parameter set;
b-3) a device template manager configured to manage, for each of the plurality of device classes, a plurality of device templates,
each of the plurality of device templates comprising:
a device master information, block information, parameter information, document links, plug-in application associations, and a plurality of different class parameter sets being respectively associated with a plurality of different device applications of a plant field device belonging to a device class of the plurality of device classes,
wherein the device template manager comprises:
b-3-1) logic to assign a respective device template, which includes a respective class parameter set, to at least one of registered non-physical plant field devices which are classified to each of the plurality of device classes;
b-3-2) logic to browse a respective set of registered non-physical plant field devices which match with each of the plurality of device classes; and
b-3-5) logic to assign a respective class parameter set, to at least one of registered non-physical plant field devices which are classified to each of a plurality of device classes, based on a device template of the at least one of the registered non-physical plant field devices; and
b-4) a device parameter auditor further comprising:
b-4-1) logic to acquire each class parameter set assigned by the device template manager from the device template manager;
b-4-2) logic to acquire a corresponding physical device class parameter set from a respective sub-set of one or more physical plant field devices installed in a plant, wherein the corresponding physical device class parameter set corresponds to each class parameter set assigned by the device template manager; and b-4-3) logic to compare a parameter value between at least a device parameter of each class parameter set assigned by the device template manager and at least a corresponding parameter of the corresponding physical device class parameter set corresponding to each class parameter set assigned by the device template manager.

11. The plant device management system according to claim 10, wherein
the logic to compare the parameter value compares the flagged device parameter of each class parameter set assigned by the device template manager and the at least a corresponding parameter of the corresponding physical device class parameter set corresponding to each class parameter set assigned by the device template manager.

12. A plant device management method comprising:
extracting, by a device parameter set creator tool, parameters and default values of the parameters from a plurality of device description files associated with a single device class, each of the plurality of device description files describing device parameters and default parameter values for a respective plant field device, while the respective plant field device is not connected to a plant control system, wherein each of the plurality of device description files is associated with a respective device class of a plurality of device classes for classifying a plurality of plant field devices, and the plurality of device classes being defined by a predefined set of classification rules related to a plurality of registered plant field devices, the predefined set of classification rules being defined by an identification which identifies a field device manufacturer; a field device type; and a plant field device revision;
creating, by a device parameter set creator tool, a respective class parameter set for the single device class from the extracted parameters and default values of the parameters of the plurality of device description files associated with the single device class;
configuring, by a device parameter set configuring tool, the respective class parameter set, the configuring comprising:
changing a device parameter value of a device parameter included in the respective class parameter set; and
flagging a device parameter included in the respective class parameter set;
managing, by a device template manager for each of the plurality of device classes, a plurality of device templates, each of the plurality of device templates comprising a device master information, block information, parameter information, document links, plug-in application associations, and a plurality of different class parameter sets being respectively associated with a plurality of different device applications of a plant field device belonging to a device class of the plurality of device classes;
wherein the managing comprises:
assigning a respective device template, which includes a respective class parameter set, to at least one of registered non-physical plant field devices which are classified to each of the plurality of device classes; and
browsing a respective set of registered non-physical plant field devices which match with each of the plurality of device classes.

13. A plant device management method comprising:
extracting, by a device parameter set creator tool, parameters and default values of the parameters from a plurality of device description files associated with a single device class, each of the plurality of device description files describing device parameters and default parameter values for a respective plant field device, while the respective plant field device is not connected to a plant control system, wherein each of the plurality of device description files is associated with a respective device class of a plurality of device classes for classifying a plurality of plant field devices, and the plurality of device classes being defined by a predefined set of classification rules related to a plurality of registered plant field devices, the predefined set of classification rules being defined by an identification which identifies a field device manufacturer; a field device type; and a plant field device revision;
creating, by a device parameter set creator tool, a respective class parameter set for the single device class from the extracted parameters and default values of the parameters of the plurality of device description files associated with the single device class;
configuring, by a device parameter set configuring tool, the respective class parameter set, the configuring comprising:
changing a device parameter value of a device parameter included in the respective class parameter set; and
flagging a device parameter included in the respective class parameter set;
managing, by a device template manager for each of the plurality of device classes, a plurality of device templates, each of the plurality of device templates comprising a device master information, block information, parameter information, document links, plug-in application associations, and a plurality of different class parameter sets being respectively associated with a plurality of different device applications of a plant field device belonging to a device class of the plurality of device classes;
wherein the managing comprises:
assigning a respective device template, which includes a respective class parameter set, to at least one of registered non-physical plant field devices which are classified to each of a plurality of device classes;
browsing a respective set of registered non-physical plant field devices which match with each of the plurality of device classes;
acquiring each class parameter set assigned by a device template manager from the device template manager;
acquiring a corresponding physical device class parameter set from a respective sub-set of one or more physical plant field devices installed in a plant, wherein the corresponding physical device class parameter set corresponds to each class parameter set assigned by the device template manager; and
comparing a parameter value between at least a device parameter of each class parameter set assigned by the device template manager and at least a corresponding parameter of the corresponding physical device class parameter set corresponding to each class parameter set assigned by the device template manager.

14. The plant device management method according to claim 13,
wherein comparing the parameter value comprises comparing the flagged device parameter of each class parameter set assigned by the device template manager with a corresponding parameter of the corresponding physical device class parameter set corresponding to each class parameter set assigned by the device template manager.

\* \* \* \* \*